US012811623B2

(12) United States Patent
Yu et al.

(10) Patent No.: US 12,811,623 B2
(45) Date of Patent: Nov. 24, 2026

(54) COMMUNICATION METHOD AND APPARATUS

(71) Applicant: HUAWEI TECHNOLOGIES CO., LTD., Shenzhen (CN)

(72) Inventors: Jian Yu, Beijing (CN); Yawei Yu, Shenzhen (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 656 days.

(21) Appl. No.: 18/191,352

(22) Filed: Mar. 28, 2023

(65) Prior Publication Data

US 2023/0239932 A1 Jul. 27, 2023

Related U.S. Application Data

(63) Continuation of application No. PCT/CN2020/119038, filed on Sep. 29, 2020.

(51) Int. Cl.
*H04W 74/0833* (2024.01)
*H04B 1/713* (2011.01)
*H04W 74/00* (2009.01)

(52) U.S. Cl.
CPC .......... *H04B 1/713* (2013.01); *H04W 74/006* (2013.01); *H04W 74/0833* (2013.01); *H04B 2201/698* (2013.01)

(58) Field of Classification Search
CPC .......................... H04B 1/713; H04B 2201/698; H04B 7/0456; H04B 1/7143; H04W 74/006;

(Continued)

(56) References Cited

U.S. PATENT DOCUMENTS

2017/0359836 A1* 12/2017 Kato ..................... H04W 74/08
2020/0245364 A1* 7/2020 Kim ...................... H04L 1/1887

(Continued)

FOREIGN PATENT DOCUMENTS

CN 104780617 A 7/2015
CN 108347789 A 7/2018

(Continued)

OTHER PUBLICATIONS

India Office Action issued in corresponding India Application No. 202327021185, dated Feb. 20, 2024, pp. 1-6.

(Continued)

*Primary Examiner* — Ayaz R Sheikh
*Assistant Examiner* — Mang Boi Thawng
(74) *Attorney, Agent, or Firm* — HAUPTMAN HAM, LLP

(57) ABSTRACT

A communication method and apparatus where the method includes: a network device that receives a random access request from a terminal device; and the network device sends a random access response to the terminal device, where the random access response includes scheduling information of a message 3 that includes first information that a request that the terminal device repeatedly transmit the message 3 by using same transmit power and a same precoding matrix. In response to repeatedly transmitting the message 3, the terminal device with the same transmit power and the same precoding matrix, so that stability of transmission of the message 3 is improved, and a transmission success rate of the message 3 is improved, thereby improving an access success rate of a random access procedure of the terminal device.

20 Claims, 8 Drawing Sheets

(58) Field of Classification Search
CPC ............. H04W 74/0833; H04W 48/08; H04W 52/146; H04W 74/004; H04L 1/08; H04L 1/1864; H04L 1/189
See application file for complete search history.

(56) References Cited

U.S. PATENT DOCUMENTS

| | | | | |
|---|---|---|---|---|
| 2021/0266955 | A1* | 8/2021 | Taherzadeh Boroujeni | H04W 72/046 |
| 2021/0392679 | A1* | 12/2021 | Kim | H04W 72/23 |
| 2021/0392699 | A1* | 12/2021 | Park | H04L 1/1864 |
| 2022/0279589 | A1* | 9/2022 | Taherzadeh Boroujeni | H04L 1/0016 |
| 2023/0262753 | A1* | 8/2023 | Axnäs | H04L 1/189 370/329 |
| 2024/0215015 | A1* | 6/2024 | Su | H04L 1/08 |

FOREIGN PATENT DOCUMENTS

| | | | |
|---|---|---|---|
| EP | 3697139 | A1 | 8/2020 |
| WO | 2015109512 | A1 | 7/2015 |
| WO | 2019031427 | A1 | 2/2019 |
| WO | 2019095307 | A1 | 5/2019 |
| WO | 2019160359 | A1 | 8/2019 |

OTHER PUBLICATIONS

ZTE Corp. Feature lead summary on coverage enhancement forchannels other than PUSCH and PUCCH R1-2007392, 3GPP TSG RAN WGI #102-e, Aug. 17-28, 2020, total 53 pages.

Huawei et al.Consideration on RACH procedure R2-151297, 3GPP TSG RAN WG2 Meeting #89bis, Apr. 20-24, 2015, total 3 pages.

3GPP TS 38.213 V16.2.0:"3rd Generation Partnership Project; Technical Specification Group Radio Access Network; NR; Physical layer procedures for control (Release 16)",Jun. 2020,total 176 pages.

3GPP TS 38.214 V16.2.0:"3rd Generation Partnership Project; Technical Specification Group Radio Access Network; NR; Physical layer procedures for data (Release 16)",Jun. 2020,total 163 pages.

"3rd Generation Partnership Project; Technical Specification Group Radio Access Network; NR; Physical layer procedures for data (Release 16)", 3GPP Draft; 38214-G20,Jul. 20, 2020,V16.2.0, XP052300295 ,total 163 pages.

Ericsson: "Summary of 7.1.3.1 (DCI contents and formats)", 3GPP Draft; R1-1809701,Aug. 21, 2018, XP051517053 ,total 19 pages.

Moderator (China Telecom): "[102-e-NR-CovEnh-03] Email discussion/approval on PUSCH coverage enhancement", 3GPP Draft; R1-2007404, Aug. 29, 2020,XP052348771 ,total 93 pages.

Samsung: "Discussion on msg3 power determination", 3GPP Draft; R1-2006087, Aug. 7, 2020,XP052347461,total 7 pages.

Mediatek Inc: "Draft CR on correction for Msg3 PUSCH retransmission power control", 3GPP Draft; R1-2005630, Aug. 8, 2020, XP052347004,total 2 pages.

Moderator (ZTE Corporation): "Feature lead summary on coverage enhancement for channels other than PUSCH and PUCCH", 3GPP Draft; R1-2007392,Aug. 29, 2020, XP052348759 ,total 53 pages.

"3rd Generation Partnership Project; Technical Specification Group Radio Access Network; NR; Physical layer procedures for control (Release 16)", 3GPP Draft; 38213-G20,V16.2.0,Jul. 20, 2020,XP052300289 , total 176 pages.

Extended European Search Report issued in corresponding European Application No. 20955596.0, dated Sep. 19, 2023, pp. 1-13.

* cited by examiner

COMMUNICATION METHOD AND APPARATUS

CROSS-REFERENCE TO RELATED APPLICATIONS

This application is a continuation of International Application No. PCT/CN2020/119038, filed on Sep. 29, 2020, the disclosure of which is hereby incorporated in entirety by reference.

BACKGROUND

In wireless communication systems such as long term evolution (long term evolution, LTE) systems or new radio (new radio, NR) systems, a terminal device in idle mode or inactive (inactive) mode accesses a base station through a random access procedure. In the random access procedure, the terminal device sends a message 3 (message 3, Msg 3) through a physical uplink shared channel (physical uplink shared channel, PUSCH).

In the random access procedure, a radio resource control (radio resource control, RRC) connection has not been established between the terminal device and a network device. Therefore, in a coverage-limited scenario, because a signal to interference plus noise ratio (signal to interference plus noise ratio, SINR) is low, a transmission success rate of the message 3 is low. In response to the message 3 failing to be transmitted, although a probability of successful transmission of the message 3 is increased through retransmission, an access delay is increased. In addition, the terminal device is completely unable to access a network. This affects normal communication.

In conclusion, how to enhance coverage of the message 3 to improve the transmission success rate of the message 3 and therefore improve a success rate of randomly accessing the network by the terminal device is an urgent problem to be resolved.

SUMMARY

An objective of implementations of some embodiments is to provide a communication method and apparatus, to improve a success rate of randomly accessing a network by a terminal device.

Some embodiments provide a communication method. The method is applied to a scenario in which a terminal device accesses a network device through a random access procedure. An execution entity of the method is a network device or a module in a network device. An example in which the execution entity is a network device is used for description. A network device receives a random access request from a terminal device; and the network device sends a random access response to the terminal device, where the random access response includes scheduling information of a message 3, the scheduling information includes first information, and the first information indicates the terminal device to repeatedly transmit the message 3 by using same transmit power and a same precoding matrix.

By implementing the method provided in some embodiments, in response to repeatedly transmitting the message 3, the terminal device uses the same transmit power and the same precoding matrix, so that stability of transmission of the message 3 is improved, and a transmission success rate of the message 3 is improved, thereby improving an access success rate of a random access procedure of the terminal device.

In some embodiments the scheduling information further includes second information, the second information indicates a repetition type of the message 3, and the repetition type is a first repetition type or a second repetition type; in response to the message 3 being repeatedly transmitted by using the first repetition type, an index value of a start symbol for each time of repeated transmission of the message 3 is the same; and in response to the message 3 being repeatedly transmitted by using the second repetition type, an index value of a start symbol for each time of repeated transmission of the message 3 is different.

In some embodiments the network device sends third information to the terminal device, where the third information indicates a frequency hopping mode for repeatedly transmitting the message 3.

In some embodiments the frequency hopping mode includes one or more of the following: a first frequency hopping mode, in which a first frequency domain position is used for first N times of repeated transmission, and a second frequency domain position is used for subsequent M times of repeated transmission, where N is an integer greater than 0, M is an integer greater than 0, and N+M is greater than 2; and a second frequency hopping mode, including X times of repeated transmission, where frequency domain positions for an $i^{th}$ time of repeated transmission and an $(i+L)^{th}$ time of repeated transmission are the same, and frequency domain positions for at least two times of repeated transmission from the $i^{th}$ time of repeated transmission to an $(i+L-1)^{th}$ time of repeated transmission are different, where X is an integer greater than 2, i is 0, 1, . . . , or X−1, and L is an integer less than X.

In some embodiments the third information is located in the scheduling information; or the third information is located in a system information block SIB1 or another system message.

In some embodiments the scheduling information further includes fourth information, and the fourth information indicates a quantity of times of repeated transmission of the message 3.

In some embodiments the fourth information is an index value of the quantity of times of repeated transmission.

In some embodiments the method further includes: The network device performs joint channel estimation on the repeatedly transmitted message 3 from the terminal device, and receives the message 3 based on a result of the joint channel estimation.

Some embodiments further provide a communication apparatus. The communication apparatus has a function of implementing any method provided in some embodiments. The communication apparatus is implemented by hardware, or is implemented by hardware executing corresponding software. The hardware or the software includes one or more units or modules corresponding to the foregoing functions.

In some embodiments, the communication apparatus includes a processor. The processor is configured to support the communication apparatus in performing the corresponding functions of the terminal device in the foregoing method. The communication apparatus further includes a memory. The memory is coupled to the processor, and stores program instructions and data that are for the communication apparatus. Optionally, the communication apparatus further includes a communication interface. The communication interface is configured to support communication between the communication apparatus and a device, for example, a network device.

In some embodiments, the communication apparatus includes corresponding functional modules, respectively configured to implement the steps in the foregoing method. The functions are implemented by hardware, or is implemented by hardware executing corresponding software. The hardware or software includes one or more modules corresponding to the foregoing functions.

In some embodiments, a structure of the communication apparatus includes a processing unit and a communication unit. Such units perform the corresponding functions in the foregoing method example. For details, refer to the descriptions in the method provided in some embodiments. Details are not described herein again.

Some embodiments provide a method. The method is applied to a scenario in which a terminal device accesses a network device through a random access procedure. An execution entity of the method is a terminal device or a module in a terminal device. An example in which the execution entity is a terminal device is used for description. A terminal device receives a random access response from a network device, where the random access response includes scheduling information of a message 3, the scheduling information includes first information, and the first information indicates the terminal device to repeatedly transmit the message 3 by using same transmit power and a same precoding matrix; and the terminal device repeatedly transmits the message 3 based on the first information by using the same transmit power and the same precoding matrix.

By implementing the method provided in some embodiments, in response to repeatedly transmitting the message 3, the terminal device uses the same transmit power and the same precoding matrix, so that stability of transmission of the message 3 is improved, and a transmission success rate of the message 3 is improved, thereby improving an access success rate of a random access procedure of the terminal device.

In some embodiments, the scheduling information further includes second information, the second information indicates a repetition type of the message 3, and the repetition type is a first repetition type or a second repetition type; in response to the message 3 being repeatedly transmitted by using the first repetition type, an index value of a start symbol for each time of repeated transmission of the message 3 is the same; and in response to the message 3 being repeatedly transmitted by using the second repetition type, an index value of a start symbol for each time of repeated transmission of the message 3 is different.

In some embodiments, the terminal device receives third information from the network device, where the third information indicates a frequency hopping mode for repeatedly transmitting the message 3.

In some embodiments, the frequency hopping mode includes one or more of the following: a first frequency hopping mode, in which a first frequency domain position is used for first N times of repeated transmission, and a second frequency domain position is used for subsequent M times of repeated transmission, where N is an integer greater than 0, M is an integer greater than 0, and N+M is greater than 2; and a second frequency hopping mode, including X times of repeated transmission, where frequency domain positions for an $i^{th}$ time of repeated transmission and an $(i+L)^{th}$ time of repeated transmission are the same, and frequency domain positions for at least two times of repeated transmission from the $i^{th}$ time of repeated transmission to an $(i+L-1)^{th}$ time of repeated transmission are different, where X is an integer greater than 2, i is 0, 1, . . . , or X−1, and L is an integer less than X.

In some embodiments, the third information is located in the scheduling information; or the third information is located in a system information block SIB1 or another system message.

In some embodiments, the scheduling information further includes fourth information, and the fourth information indicates a quantity of times of repeated transmission of the message 3.

In some embodiments, the fourth information is an index value of the quantity of times of repeated transmission.

Some embodiments further provide a communication apparatus. The communication apparatus implements any method provided in some embodiments. The communication apparatus is implemented by hardware, or is implemented by hardware executing corresponding software. The hardware or the software includes one or more units or modules corresponding to the foregoing functions.

In some embodiments, the communication apparatus includes a processor. The processor is configured to support the communication apparatus in performing the corresponding functions of the network device in the foregoing method. The communication apparatus further includes a memory. The memory is coupled to the processor, and stores program instructions and data that are for the communication apparatus. Optionally, the communication apparatus further includes a communication interface. The communication interface is configured to support communication between the communication apparatus and a device such as a network device.

In some embodiments, the communication apparatus includes corresponding functional modules, respectively configured to implement the steps in the foregoing method. The functions are implemented by hardware, or is implemented by hardware executing corresponding software. The hardware or software includes one or more modules corresponding to the foregoing functions.

In some embodiments, a structure of the communication apparatus includes a processing unit and a communication unit. Such units perform the corresponding functions in the foregoing method example. For details, refer to the descriptions in the method provided in some embodiments. Details are not described herein again.

In some embodiments, a communication apparatus is provided, including functional modules configured to implement the method in any embodiment.

In some embodiments, a communication apparatus is provided, including functional modules configured to implement the method in any embodiment.

In some embodiments, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method in any embodiment through a logic circuit or by executing code instructions.

In some embodiments, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method in any one embodiment through a logic circuit or by executing code instructions.

In some embodiments, a computer-readable storage medium is provided. The computer-readable storage medium stores a computer program or instructions. In response to the computer program or the instructions being executed by a processor, the method in any embodiment.

In some embodiments, a computer program product including instructions is provided. In response to the instructions being run by a processor, the method in any embodiment.

In some embodiments, a chip system is provided. The chip system includes a processor, and further includes a memory, configured to implement the method described in any embodiment. The chip system includes a chip, or includes a chip and another discrete device.

In some embodiments, a communication system is provided, where the system includes the apparatus (for example, a terminal device) in some embodiments.

DESCRIPTION OF EMBODIMENTS

The following further describes in detail some embodiments with reference to the accompanying drawings.

Technical solutions in some embodiments are applied to various communication systems, for example, a long term evolution (Long Term Evolution, LTE) system, an LTE frequency division duplex (Frequency Division Duplex, FDD) system, an LTE time division duplex (Time Division Duplex, TDD) system, and a new radio (New Radio, NR) system. This is not limited herein.

A terminal device in some embodiments is an entity that is on a user side and that is configured to receive or transmit a signal. The terminal device is a handheld device, an in-vehicle device, or the like that has a wireless connection function. Alternatively, the terminal device is another processing device connected to a wireless modem. The terminal device further is referred to as a wireless terminal, an access point (access point), a remote terminal (remote terminal), an access terminal (access terminal), a user terminal (user terminal), a user agent (user agent), a user device (user device), user equipment (user equipment, UE), or the like. The terminal device is a mobile terminal, for example, a mobile phone (or also referred to as a "cellular" phone) and a computer that has a mobile terminal. For example, the terminal device is a portable, pocket-size, handheld, computer built-in or in-vehicle mobile apparatus, which exchanges a voice and/or data with a radio access network. For example, common terminal devices include a mobile phone, a tablet computer, a notebook computer, a palmtop computer, a mobile Internet device (mobile Internet device, MID), and a wearable device, for example, a smartwatch, a smart band, and a pedometer. However, some embodiments are not limited thereto.

A network device in some embodiments is mainly responsible for providing a wireless connection for the terminal device, to ensure reliable transmission of uplink and downlink data of the terminal device, and the like. The network device is a next generation NodeB (next Generation node B, gNB) in an NR system, is an evolved NodeB (evolutional node B, eNB) in an LTE system, or the like. In response to the network device being a gNB, the network device includes a central unit (centralized unit, CU) and a distributed unit (distributed unit, DU).

Figure 1:
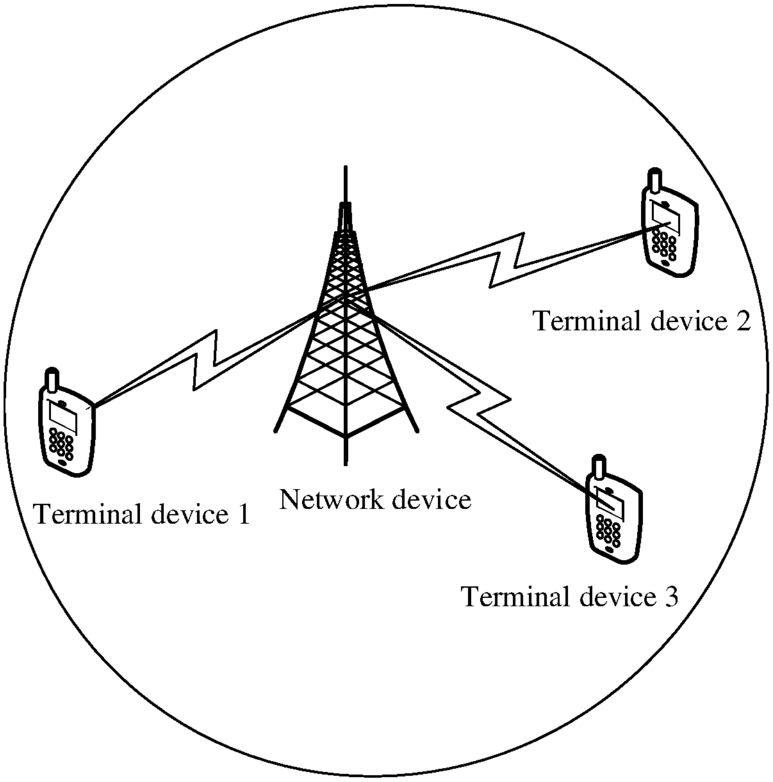
FIG. 1 is a schematic diagram of a network architecture in accordance with some embodiments.

A method provided in some embodiments are applied to a communication system shown in FIG. 1. A single-cell communication system includes a network device and a terminal device 1 to a terminal device 3. The terminal device 1 to the terminal device 3 separately or simultaneously sends uplink data to the network device, and the network device separately or simultaneously sends downlink data to the terminal device 1 to the terminal device 3. FIG. 1 is an example for description, and does not limit a quantity of terminal devices in the communication system, a quantity of network devices in the communication system, and a quantity of cells covered by the network device.

Figure 2:
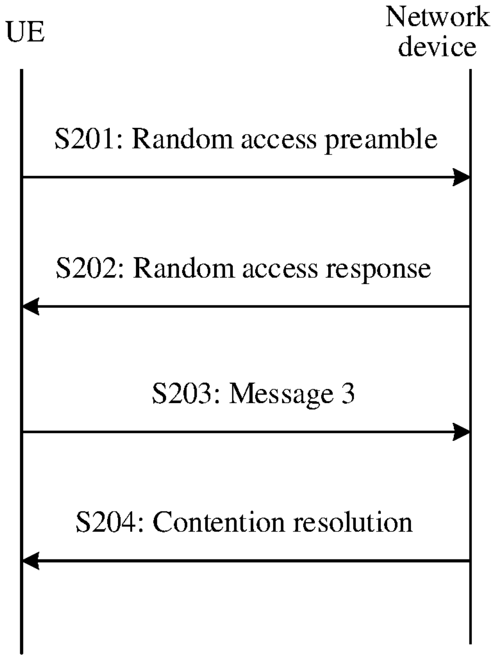
FIG. 2 is a schematic diagram of a random access procedure in a current technology.

Some embodiments are applicable to a random access procedure. In wireless communication systems such as an LTE system and an NR system, UE enters a radio resource control (radio resource control, RRC) RRC connected mode from an idle mode or an inactive (inactive) mode through random access, establish various bearers with a network device, obtain some resources and parameter configurations, and further communicate with the network device. Currently, in the wireless communication systems such as the LTE system and the NR system, the UE generally performs random access through the following procedure, as shown in FIG. 2.

S201: The UE sends a random access preamble (random access preamble) to the network device.

The random access preamble further is referred to as a message 1 (message 1, Msg1) or a random access request. A function of the random access preamble is to notify the network device that there is a random access request.

S202: The network device sends a random access response (random access response, RAR) to the UE after detecting the random access preamble. The random access response further is referred to as a message 2 (message 2, Msg2). The random access response includes scheduling information of a message 3, namely, RAR uplink (uplink, UL) grant (grant) information. The random access response further includes other information. Details are not described herein.

S203: The UE receives the random access response, and sends the message 3 on a time-frequency resource scheduled by using the scheduling information in the random access response. The message 3 is carried on a physical uplink shared channel (physical uplink shared channel, PUSCH). The message 3 carries information such as a unique user identifier of the UE.

S204: The network device receives the message 3 of the UE, and returns a contention resolution message to the successfully accessing UE, where the contention resolution message is also referred to as a message 4 (message 4, Msg4). The network device includes, in the conflict resolution message, the unique user identifier in the message 3, to specify the successfully accessing UE, and other UE that fails in access initiates random access again.

In a current technology, for how to determine transmit power for the message 3, refer to descriptions in the 3rd generation partnership project (the 3rd generation partnership project, 3GPP) technical specification (technical specification, TS) 38.213. According to content in 3GPP TS 38.213, the transmit power for the message 3 is related to a plurality of parameters. A path loss parameter is constantly changing. This significantly affects transmit power for the message 3 at different time points. In addition, in response to intra-slot frequency hopping and inter-slot frequency hopping being performed on the message 3, because a start position of a frequency domain resource block (resource block, RB) changes, a power back-off value changes. Consequently, the transmit power for the message 3 also changes.

From the foregoing process that successful transmission of the message 3 is helpful for success of the random access procedure. Therefore, some embodiments provide a method to increase a probability of successfully transmitting the message 3, to improve a success rate of the random access. The following provides descriptions in detail.

In some embodiments, network architectures and service scenarios described in are intended to describe the technical solutions in more clearly, and do not constitute a limitation on the technical solutions provided in some embodiments. A person of ordinary skill in the art is able to know that: With evolution of the network architectures and emergence of new service scenarios, the technical solutions provided in some embodiments are also applicable to similar technical problems.

Figure 3:
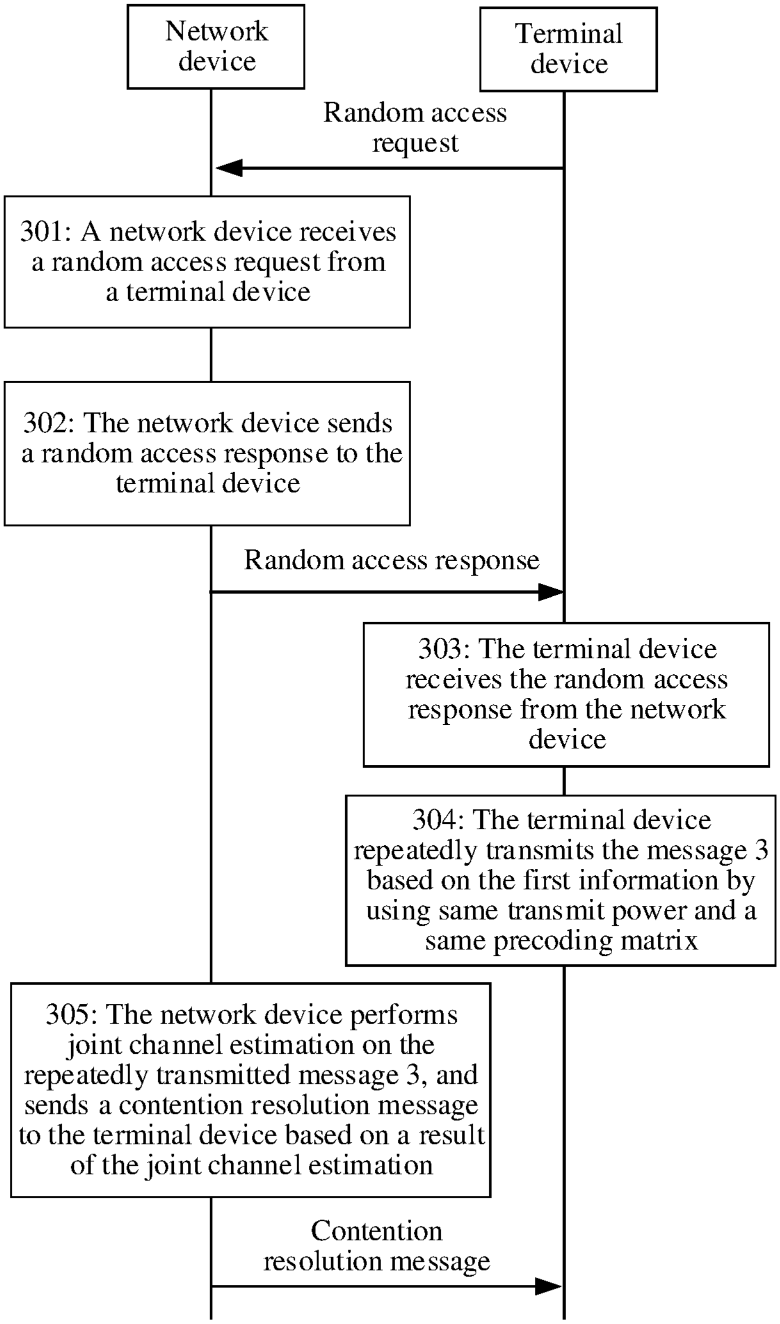
FIG. 3 is a schematic flowchart of a communication method according to some embodiments.

With reference to the foregoing descriptions, FIG. 3 is a schematic flowchart of a communication method according to some embodiments. Refer to FIG. 3. The method includes the following steps.

S301: A network device receives a random access request from a terminal device.

The random access request is a random access preamble or a message 1 sent by the terminal device. In some embodiments, how the terminal device sends the random access request and how the network device receives the random access request, refer to descriptions in a current technology. This is not limited in some embodiments.

S302: The network device sends a random access response to the terminal device.

The random access response further is referred to as a message 2, the random access response includes scheduling information of a message 3, and the scheduling information included in the random access response is an RAR UL grant in the random access response. The scheduling information includes first information, and the first information indicates the terminal device to repeatedly transmit the message 3 by using same transmit power and a same precoding matrix.

In some embodiments, the scheduling information further includes other information in addition to the first information. This is described in detail below.

S303: The terminal device receives the random access response from the network device.

How the terminal device receives the random access response is not limited in some embodiments. For details, refer to descriptions in the current technology.

S304: The terminal device repeatedly transmits the message 3 based on the first information by using the same transmit power and the same precoding matrix.

In some embodiments, repeatedly transmitting the message 3 means that after sending the message 3 and before receiving a contention resolution message from the network device, the terminal device sends, on a plurality of transmission occasions, repeated information corresponding to the message 3 or a plurality of redundancy versions (redundancy version, RV) of the message 3. The first time of transmission of the message 3 is referred to as initial transmission, or the $0^{th}$ time of repeated transmission, and subsequent transmission is sequentially referred to as the first time of repeated transmission, the second time of repeated transmission, and the like.

Optionally, transmit power used by the terminal device for each time of repeated transmission of the message 3 is equal to transmit power for the initial transmission of the message 3.

Optionally, a precoding matrix used by the terminal device for each time of repeated transmission of the message 3 is the same as a precoding matrix for the initial transmission of the message 3.

Optionally, in response to the message 3 being repeatedly transmitted, an index value RV_index of a redundancy version for each time of repeated transmission satisfies the following formula:

$$\text{RV\_index} = \text{mod}(X-1, L). \quad (1)$$

L is a total quantity of redundancy versions, X is a quantity of times of repeated transmission, X is a positive integer greater than or equal to 1, and mod( ) is a modulo function. For example, the total quantity of redundancy versions is 4, and a set of the redundancy versions is {0, 2, 3, 1}. In response to RV_index corresponding to 0, the first redundancy version in the set is selected, that is, the redundancy version is 0; in response to RV_index being 1, the second redundancy version in the set is selected, that is, the redundancy version is 2; in response to RV_index being 2, the third redundancy version in the set is selected, that is, the redundancy version is 3; and in response to RV_index being 3, the fourth redundancy version in the set is used, that is, the redundancy version is 1. The foregoing is an example, and another mapping relationship between a redundancy version and an index value is not limited in the embodiments.

Through the foregoing procedure, in response to repeatedly transmitting the message 3, the terminal device uses the same transmit power and the same precoding matrix, so that stability of transmission of the message 3 is improved, and a transmission success rate of the message 3 is improved, thereby improving an access success rate of a random access procedure of the terminal device.

Optionally, the method further includes S305: The network device performs joint channel estimation on the repeatedly transmitted message 3, and sends the contention resolution message to the terminal device based on a result of the joint channel estimation.

Figure 4:
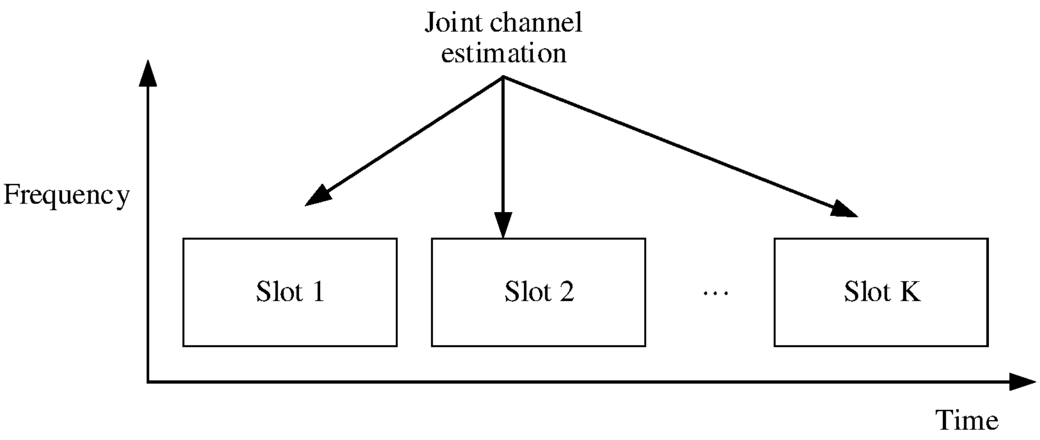
FIG. 4 is a schematic diagram of joint channel estimation according to some embodiments.

How the network device performs joint channel estimation is not limited in some embodiments. For example, as shown in FIG. 4, in response to the message 3 being repeatedly transmitted for K times, assuming that each time of repeated transmission is performed in one slot (slot) (in other words, a slot-based scheduling method is used), K slots (a slot 1 to a slot K) are useable to send the message 3.

In response to the joint channel estimation not being performed, the network device separately performs channel estimation based on a demodulation reference signal (demodulation reference signal, DMRS) in a PUSCH that carries the message 3 and that is in each slot. In response to the joint channel estimation being performed, the network device performs channel estimation jointly based on DMRSs in at least two of the K slots. Using FIG. 4 as an example, the joint channel estimation in some embodiments means that channel estimation in the slot 1 is performed by jointly using a DMRS in the slot 1 and a DMRS in another slot, or channel estimation in the slot 2 is performed by jointly using a DMRS in the slot 2 and a DMRS in another slot. In other words, the joint channel estimation means that channel estimation in a slot or mini (mini) slot is performed by combining a DMRS in the slot or the mini slot and a DMRS in another slot or mini slot. A quantity of symbols in one mini slot is less than 14. A symbol in some embodiments are an orthogonal frequency division multiplexing (orthogonal frequency division multiplexing, OFDM) symbol, where the OFDM symbol is referred to as a symbol for short below.

Because of correlation of a channel change in terms of time, a more accurate channel estimation result is obtained through joint channel estimation between a plurality of slots. For example, in response to a block error rate (Block error rate, BLER) being 0.1, a signal-to-noise ratio (signal noise ratio, SNR) corresponding to joint channel estimation of three slots is approximately 2 dB lower than an SNR obtained without joint channel estimation.

Although the joint channel estimation improves channel estimation performance, the premise is to ensure that in response to the terminal device sending the message 3 on the PUSCH, transmit power in slots calls for consistency, and a phase of a power amplifier is continuous. Otherwise, the joint channel estimation results in negative gains.

With reference to the foregoing description, because the terminal device repeatedly transmits the message 3 by using the same transmit power and the same precoding matrix each time, the network device performs joint channel estimation on the repeatedly transmitted message 3, so that time-domain channel correlation is effectively used, and a more accurate channel estimation result is obtained, thereby improving a demodulation capability of the PUSCH. Improvement of the demodulation capability of the PUSCH means that the message 3 is successfully received in response to a signal to interference plus noise ratio (signal to interference plus noise ratio, SINR) being low, that is, a success rate of receiving the message 3 is improved, so that uplink coverage of the message 3 is effectively improved without increasing the transmit power of the message 3.

In some embodiments, a field is added to the scheduling information for scheduling the message 3 to carry the first information. For details, refer to Table 1.

TABLE 1

| Field | Quantity of included bits |
|---|---|
| Frequency hopping flag | 1 |
| PUSCH frequency resource allocation | 12 or 14 |
| PUSCH time resource allocation | 4 |
| Modulation and coding scheme | 4 |
| Transmit power control | 3 |
| Channel state information request | 1 |
| Channel access type and cyclic prefix type indication | 0 or 2 |
| First information | 1 |

The first information is configured to have another name, for example, "Joint channel estimation flag for Msg3 repetition". The quantity of bits included in the first information is 1, or is greater than 1. In response to the first information including one bit, and a value of the bit is 0, the transmit power and the precoding matrix for repeatedly transmitting the message 3 are not limited; or in response to the value of the bit being 1, the transmit power and the precoding matrix for repeatedly transmitting the message 3 are limited, the terminal device is indicated to repeatedly transmit the message 3 by using the same transmit power and the same precoding matrix.

Certainly, there alternatively is a converse case. in response to the value of the bit being 1, the transmit power and the precoding matrix for repeatedly transmitting the message 3 are not limited; or in response to the value of the bit being 0, the transmit power and the precoding matrix for repeatedly transmitting the message 3 are limited. In response to the first information including another quantity of bits, refer to the foregoing descriptions. Details are not described herein again.

The foregoing describes a case in which the scheduling information includes the first information. In some embodiments, the scheduling information further includes other information, for example, include one or more of the following information:

second information, where the second information indicates a repetition type of the message 3;

third information, where the third information indicates a frequency hopping mode for repeatedly transmitting the message 3; and fourth information, where the fourth information indicates a quantity of times of repeated transmission of the message 3.

The second information further is referred to as a name such as repetition type (repetition type) information. The repetition type indicated by the second information is a first repetition type or a second repetition type. The first repetition type refers to a repetition type A, and the second repetition type refers to a repetition type B. For meanings of the repetition type A and the repetition type B, refer to descriptions in 3GPP TS 38.214. Details are not described herein again.

The first repetition type and the second repetition type further is other types. For example, in response to the first repetition type being used, and the message 3 is repeatedly transmitted, an index value of a start symbol for each time of repeated transmission of the message 3 is the same, and a quantity of symbols for each time of repeated transmission of the message 3 is the same. In response to the second repetition type being used, and the message 3 is repeatedly transmitted, an index value of a start symbol for each time of repeated transmission of the message 3 is the same or different, and a quantity of symbols for each time of repeated transmission of the message 3 is the same or different.

A quantity of bits included in the second information is 1, or is greater than 1. In response to the second information including one bit, and a value of the bit is 0, the repetition type is the first repetition type; or in response to the value of the bit being 1, the repetition type is the second repetition type. Certainly, there alternatively is a converse case. In response to the value of the bit being 1, the repetition type is the first repetition type; or in response to the value of the bit being 0, the repetition type is the second repetition type. In response to the second information including another quantity of bits, refer to the foregoing descriptions. Details are not described herein again.

In some embodiments, in response to the message 3 being retransmitted, the scheduling information is indicated by DCI. A new field is added to the DCI to indicate the repetition type. In response to the repetition type not being indicated, a repetition type the same as that used during initial transmission of the message 3 is used by default.

Through the foregoing method, different repetition types are introduced to support repeated transmission of the message 3, to enhance flexibility of repeated transmission, and improve resource utilization during repeated transmission.

In the existing NR standard, because the message 3 does not support repeated transmission, intra-slot frequency hopping is used by default. The frequency hopping flag (frequency hopping flag) field in Table 1 indicates whether frequency hopping transmission is performed on the message 3. In response to frequency hopping transmission being performed, a frequency domain offset of frequency hopping varies according to different values of a bandwidth part (bandwidth part, BWP) in which a PUSCH is located, as shown in the following Table 2 (for content of Table 2, refer to descriptions in section 8.3 in 3GPP TS 38.213).

In Table 2, $$N_{BWP}^{size}$$

represents a quantity of physical resource blocks (physical resource block, PRB) included in the BWP, and $N_{UL,hop}$ represents a value of a frequency hopping indication bit. $N_{UL,hop}$ corresponds to the PUSCH frequency resource allocation (PUSCH frequency resource allocation) field in Table 1.

TABLE 2

| Quantity of PRBs included in the BWP | Value of $N_{UL,hop}$ | Frequency offset of a second hop |
|---|---|---|
| $N_{BWP}^{size} < 50$ | 0 | $\lfloor N_{BWP}^{size}/2 \rfloor$ |
| | 1 | $\lfloor N_{BWP}^{size}/4 \rfloor$ |
| $N_{BWP}^{size} \geq 50$ | 00 | $\lfloor N_{BWP}^{size}/2 \rfloor$ |
| | 01 | $\lfloor N_{BWP}^{size}/4 \rfloor$ |
| | 10 | $-\lfloor N_{BWP}^{size}/4 \rfloor$ |
| | 11 | Reserved |

In Table 2, $\lfloor\ \rfloor$ represents a rounding down operation.

For intra-slot frequency hopping, a start position of an RB is calculated through the following formula:

$$RB_{start} = \begin{cases} RB_{start} & i = 0 \\ (RB_{start} + RB_{offset}) \bmod N_{BWP}^{size} & i = 1 \end{cases}. \quad (2)$$

$RB_{start}$ refers to a first resource block (resource block, RB) allocated to the terminal device, and the PUSCH frequency resource allocation field in Table 1 indicates frequency domain resource allocation. A value of $RB_{offset}$ is a value indicated by the "frequency offset of a second hop" in Table 2. i=0 is a first hop (that is, there is no offset), and i=1 is the second hop. Assuming that the message 3 is initially transmitted, i=0, and $RB_{start}$ remains unchanged. In response to the message 3 being repeatedly transmitted for the first time, i=1. In this case, in response to $$N_{UL,hop} = 0,\ RB_{offset} = \lfloor N_{BWP}^{size}/2 \rfloor;$$

and in response to $$N_{UL,hop} = 1,\ RB_{offset} = \lfloor N_{BWP}^{size}/4 \rfloor.$$

In some embodiments, performance of the message 3 is improved by introducing a plurality of frequency hopping modes. A plurality of frequency hopping modes are set out, and the third information indicates a frequency hopping mode for repeatedly transmitting the message 3. The third information further is referred to as frequency hopping pattern indication information (frequency hopping pattern indication) or another name. This is not limited in some embodiments. In some embodiments, a frequency hopping mode includes one or more of the following:

a first frequency hopping mode, in which a first frequency domain position is used for first N times of repeated transmission, and a second frequency domain position is used for subsequent M times of repeated transmission, where N is an integer greater than 0, M is an integer greater than 0, and N+M is greater than 2;

a second frequency hopping mode, including X times of repeated transmission, where frequency domain positions for an $i^{th}$ time of repeated transmission and an $(i+L)^{th}$ time of repeated transmission are the same, and frequency domain positions for at least two times of repeated transmission from the $i^{th}$ time of repeated transmission to an $(i+L-1)^{th}$ time of repeated transmission are different, where X is an integer greater than 2, i is 0, 1, . . . , or X−1, and L is an integer less than X; and a third frequency hopping mode, including X times of repeated transmission, where a frequency domain position for each of the X times of repeated transmission is different.

Figure 5:
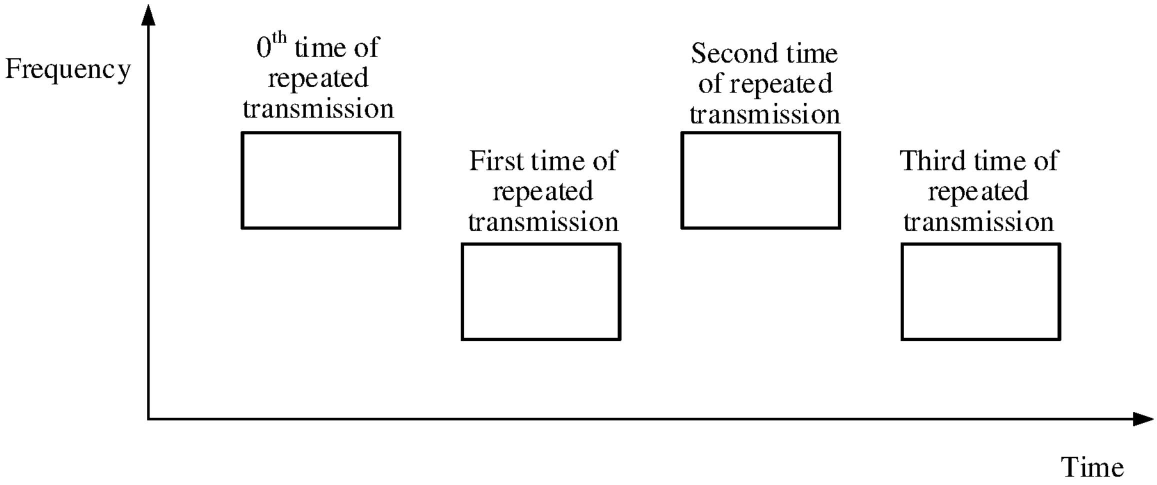
FIG. 5 is a schematic diagram of a frequency hopping mode according to some embodiments.

For example, FIG. 5 is a schematic diagram of a frequency hopping mode according to some embodiments. The frequency hopping mode shown in FIG. 5 is the second frequency hopping mode. That is, X=4 times of repeated transmission and L=2 are used as an example. In response to the repetition type being the first repetition type, a frequency hopping position for each time of repeated transmission is calculated according to the following formula:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}. \quad (3a)$$

In response to the repetition type being the second repetition type, the frequency hopping position for each time of repeated transmission is calculated according to the following formula:

$$RB_{start}(i) = \begin{cases} RB_{start} & i \bmod 2 = 0 \\ (RB_{start} + RB_{offset}) \bmod N_{BWP}^{size} & i \bmod 2 = 1 \end{cases}. \quad (3b)$$

$n_s^\mu$ is a slot index in one radio frame (10 ms), and $RB_{offset}$ uses a value in Table 2. From FIG. 5 that a same frequency domain position is used in the $0^{th}$ repeated transmission and the second repeated transmission; and a same frequency domain position is used in the first repeated transmission and the third repeated transmission, and the frequency domain position is offset by $RB_{offset}$ from the frequency domain position in the $0^{th}$ repeated transmission.

Figure 6:
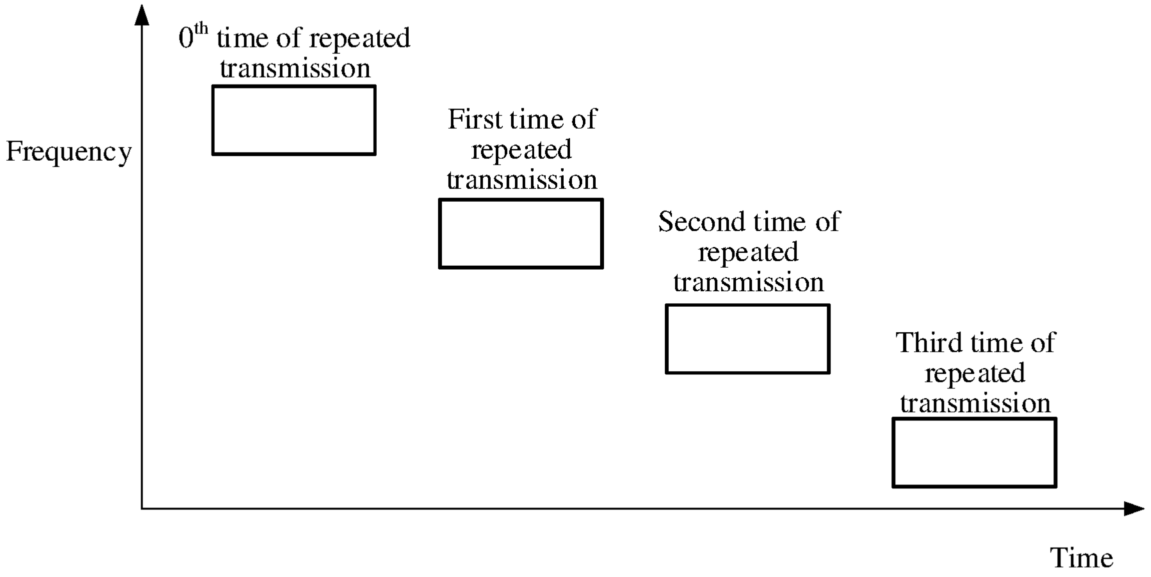
FIG. 6 is a schematic diagram of a frequency hopping mode according to some embodiments.

For example, FIG. 6 is a schematic diagram of a frequency hopping mode according to some embodiments. The frequency hopping mode shown in FIG. 6 is the third frequency hopping mode. Using X=4 times of repeated transmission as an example, a frequency hopping position for each time of repeated transmission is calculated according to the following formula:

$$RB_{start}(n_s^\mu) = \begin{cases} RB_{start} & n_s^\mu \bmod 4 = 0 \\ (RB_{start} + RB_{offset}(k)) \bmod N_{BWP}^{size} & n_s^\mu \bmod 4 = 1 \text{ or } 2 \text{ or } 3 \end{cases}. \quad (4a)$$

$RB_{offset}$ (k) represents a frequency domain offset of a different slot, $n_s^\mu$ is a slot index, and $k = n_s^\mu$ mod 4. From FIG. 6 that different frequency domain positions are used for the $0^{th}$ repeated transmission to the third repeated transmission.

Optionally, frequency hopping positions for different repeated transmission is further calculated according to the following formula:

$$RB_{start}(n_s^\mu) = \begin{cases} RB_{start} & n_s^\mu \bmod 4 = 0 \\ (RB_{start} + RB_{offset}(1)) \bmod N_{BWP}^{size} & n_s^\mu \bmod 4 = 1 \\ (RB_{start} + RB_{offset}(2)) \bmod N_{BWP}^{size} & n_s^\mu \bmod 4 = 2 \\ (RB_{start} + RB_{offset}(3)) \bmod N_{BWP}^{size} & n_s^\mu \bmod 4 = 3 \end{cases}. \quad (4b)$$

In some embodiments, in response to the frequency hopping mode being the first frequency hopping mode, in response to the repetition type being the first repetition type, the frequency hopping position of the $i^{th}$ time of repeated transmission is calculated according to the following formula:

$$RB_{start}(i) = \begin{cases} RB_{start} & i \le \lceil X/2 \rceil \\ (RB_{start} + RB_{offset}) \bmod N_{BWP}^{size} & i > \lfloor X/2 \rfloor \end{cases}. \quad (5a)$$

$\lceil\ \rceil$ represents rounding up, and X represents a quantity of times of repeated transmission.

In response to the repetition type being the second repetition type, the frequency hopping position of the $i^{th}$ repeated transmission is calculated according to the following formula:

$$RB_{start}(i) = \begin{cases} RB_{start} & \lfloor i/2 \rfloor \bmod 2 = 0 \\ (RB_{start} + RB_{offset}) \bmod N_{BWP}^{size} & \lfloor i/2 \rfloor \bmod 2 = 1 \end{cases}. \quad (5b)$$

Figure 7:
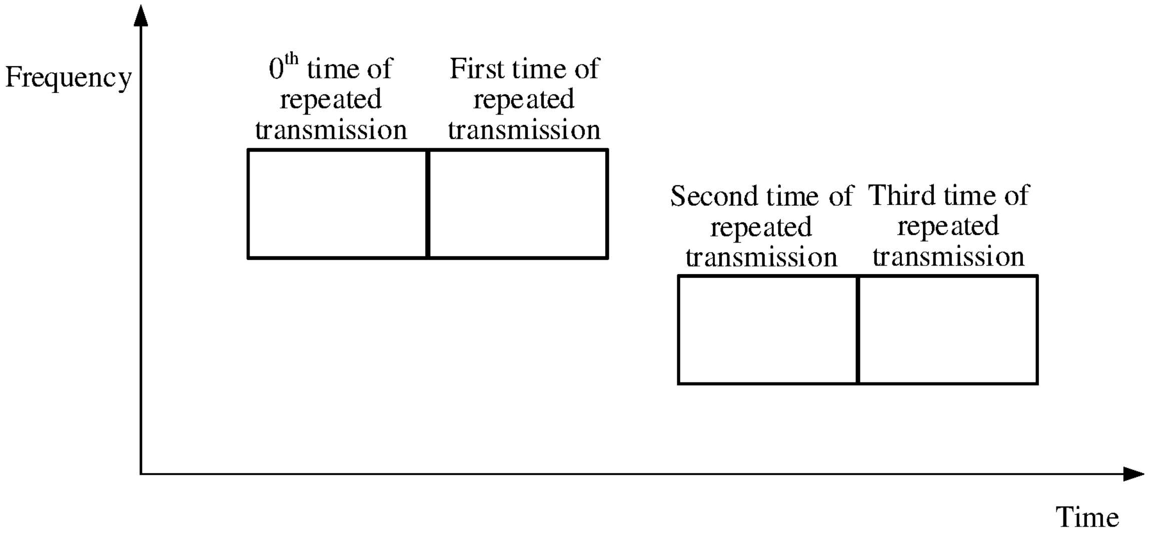
FIG. 7 is a schematic diagram of a frequency hopping mode according to some embodiments.

For example, FIG. 7 is a schematic diagram of a frequency hopping mode according to some embodiments. The frequency hopping mode shown in FIG. 7 is the first frequency hopping mode. For example, M=2 and N=2. A same frequency domain position is used for the first two times of repeated transmission, and frequency domain positions of the last two times of repeated transmission are different from that of the first two times of repeated transmission.

Formula (5a) is configured to have other variations, for example, is equivalent to formula (6):

$$RB_{start}(n_s^\mu) = \begin{cases} RB_{start} & \lfloor n_s^\mu/2 \rfloor \bmod 2 = 0 \\ (RB_{start} + RB_{offset}) \bmod N_{BWP}^{size} & \lfloor n_s^\mu/2 \rfloor \bmod 2 = 1 \end{cases}. \quad (6)$$

Meanings of parameters in formula (6) are the same as those of corresponding parameters in the foregoing formula. For details, refer to the foregoing descriptions. Details are not described herein again.

The foregoing uses an example in which the quantity of times of repeated transmission is equal to 4 for description, and the following uses an example in which the quantity of times of repeated transmission is equal to 8 for description.

Figure 8:
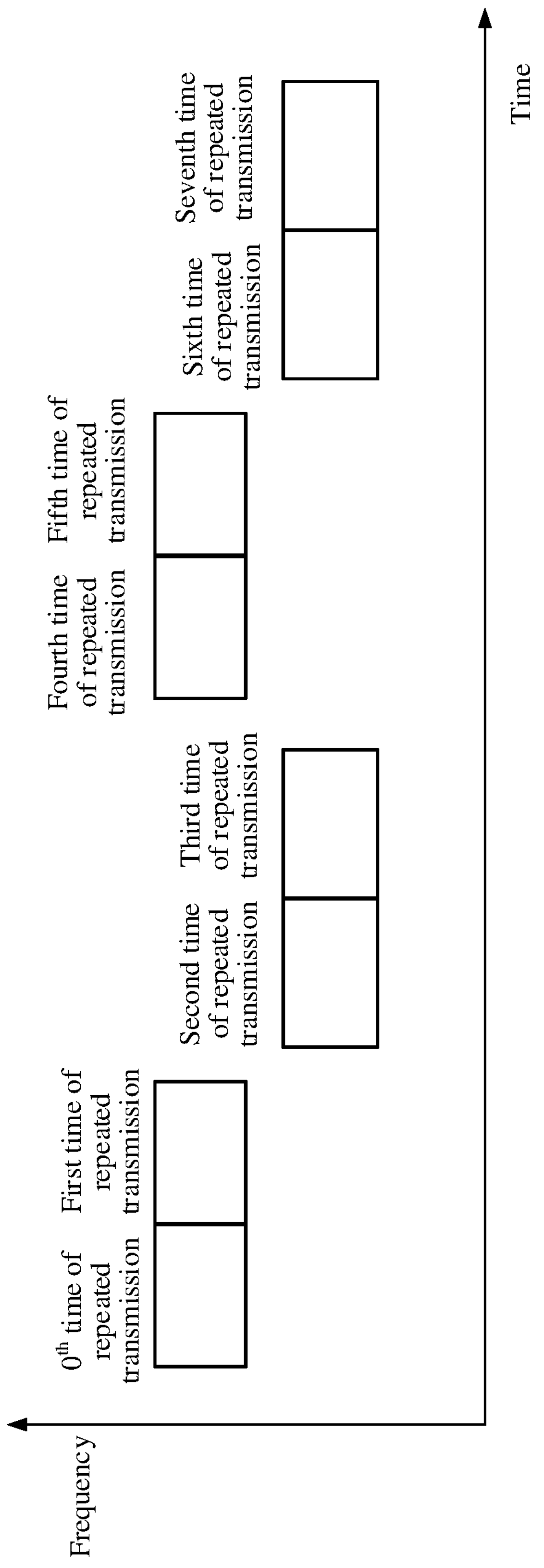
FIG. 8 is a schematic diagram of a frequency hopping mode according to some embodiments.

FIG. 8 is a schematic diagram of a frequency hopping mode according to some embodiments. The frequency hopping mode shown in FIG. 8 is the second frequency hopping mode. That is, X=8 times of repeated transmission and L=5 are used as an example. In response to the repetition type being the first repetition type, a frequency hopping position for each time of repeated transmission is calculated according to the following formula:

$$RB_{start}(n_s^\mu) = \begin{cases} RB_{start} & \lfloor n_s^\mu/2 \rfloor \bmod 2 = 0 \\ (RB_{start} + RB_{offset}) \bmod N_{BWP}^{size} & \lfloor n_s^\mu/2 \rfloor \bmod 2 = 1 \end{cases}. \quad (7)$$

Meanings of parameters in formula (7) are the same as those of corresponding parameters in the foregoing formula. For details, refer to the foregoing descriptions. Details are not described herein again.

In some embodiments, in response to the repetition type being the second repetition type, the frequency hopping position for each time of repeated transmission is determined according to formula (5b), and details are not described herein.

Figure 9:
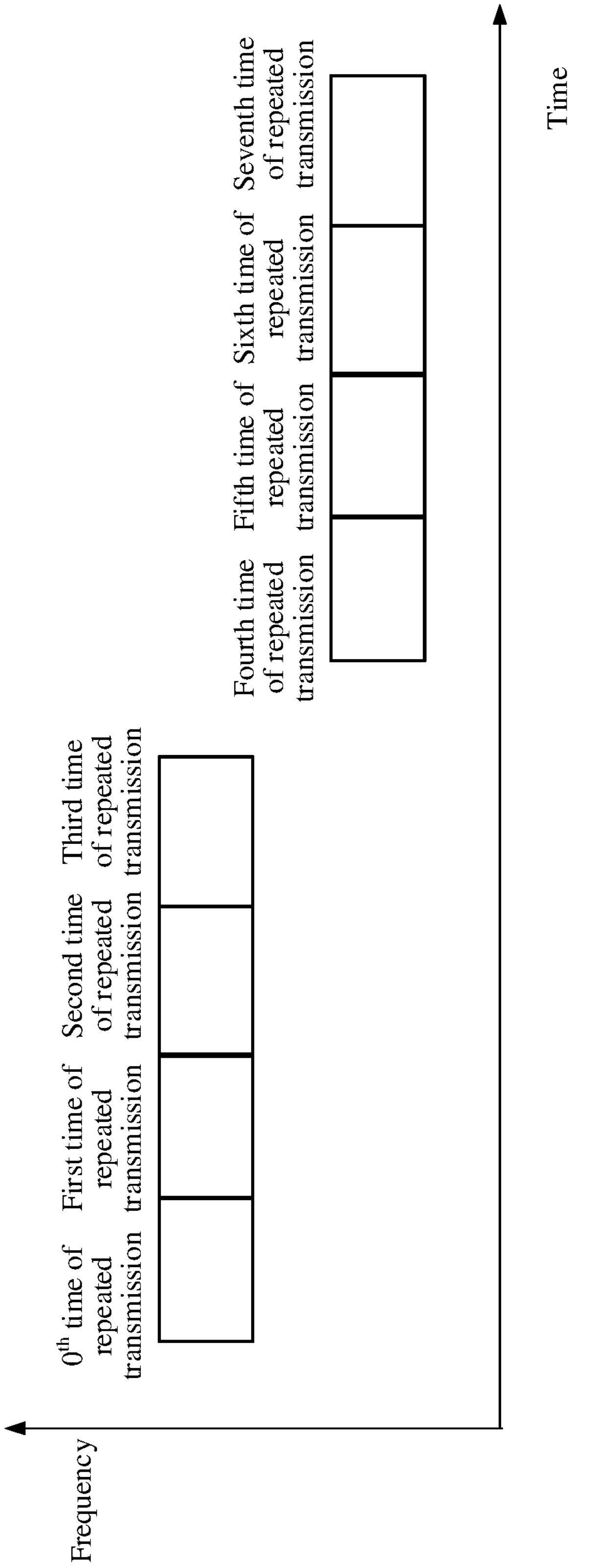
FIG. 9 is a schematic diagram of a frequency hopping mode according to some embodiments.

FIG. 9 is a schematic diagram of a frequency hopping mode according to some embodiments. The frequency hopping mode shown in FIG. 9 is the first frequency hopping mode, that is, M=4 and N=4 are used as an example. In response to the repetition type being the first repetition type, the frequency hopping position for each time of repeated transmission is calculated according to any one of the following formulas:

$$RB_{start}(i)=\begin{cases} RB_{start} & i\le\lceil X/2\rceil \\ (RB_{start}+RB_{offset})\bmod N_{BWP}^{size} & i>\lfloor X/2\rfloor \end{cases};\ \text{and} \quad (8)$$

$$RB_{start}(n_s^\mu)=\begin{cases} RB_{start} & \lfloor n_s^\mu/4\rfloor \bmod 2=0 \\ (RB_{start}+RB_{offset})\bmod N_{BWP}^{size} & \lfloor n_s^\mu/4\rfloor \bmod 2=1 \end{cases}. \quad (9a)$$

Meanings of parameters in formula (8) and formula (9a) are the same as those of corresponding parameters in the foregoing formula. For details, refer to the foregoing descriptions. Details are not described herein again. In FIG. 9, a same frequency domain position is used for the first four times of repeated transmission, a same frequency domain position is used for the last four times of repeated transmission, and the frequency domain position of the last four times of repeated transmission is different from that of the first four times of repeated transmission.

In response to the repetition type being the second repetition type, the frequency hopping position for each time of repeated transmission is calculated according to the following formula:

$$RB_{start}(i)=\begin{cases} RB_{start} & \lfloor i/2\rfloor \bmod 4=0 \\ (RB_{start}+RB_{offset})\bmod N_{BWP}^{size} & \lfloor i/2\rfloor \bmod 4=1 \end{cases}. \quad (9b)$$

Figure 10:
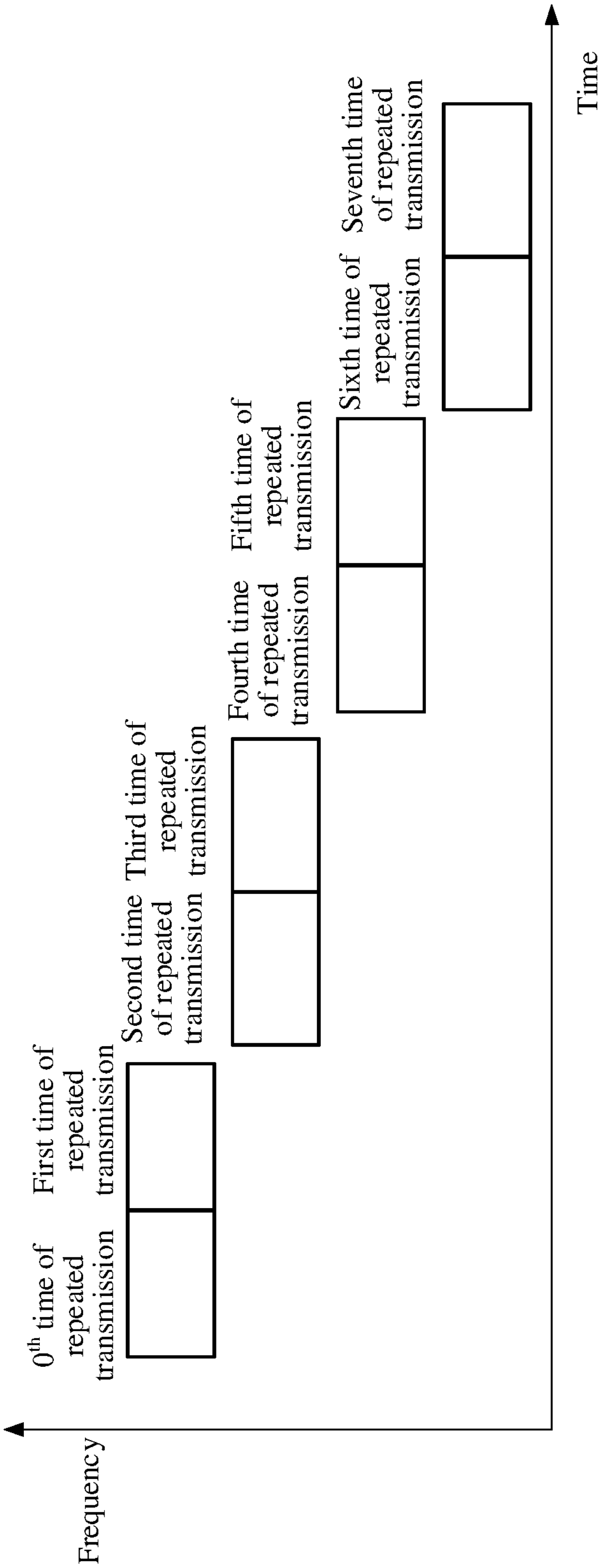
FIG. 10 is a schematic diagram of a frequency hopping mode according to some embodiments.

The foregoing is an example, and there is another frequency hopping mode. For example, FIG. 10 is a schematic diagram of a frequency hopping mode according to some embodiments. The frequency hopping mode shown in FIG. 10 includes eight times of repeated transmission. A same frequency domain position is used for the $0^{th}$ repeated transmission and the first repeated transmission. A same frequency domain position is used for the second repeated transmission and the third repeated transmission. A same frequency domain position is used for the fourth repeated transmission and the fifth repeated transmission. A same frequency domain position is used for the sixth repeated transmission and the seventh repeated transmission.

In response to the repetition type being the first repetition type, the frequency hopping mode shown in FIG. 10 satisfies the following formula:

$$RB_{start}(n_s^\mu)=\begin{cases} RB_{start} & n_s^\mu \bmod 4=0 \\ (RB_{start}+RB_{offset}(k))\bmod N_{BWP}^{size} & n_s^\mu \bmod 4=1\ \text{or}\ 2\ \text{or}\ 3 \end{cases}. \quad (10a)$$

Meanings of parameters in formula (10) are the same as those of corresponding parameters in the foregoing formula. For details, refer to the foregoing descriptions. Details are not described herein again.

Optionally, frequency hopping positions for different repeated transmission is further calculated according to the following formula:

$$RB_{start}(n_s^\mu)=\begin{cases} RB_{start} & n_s^\mu \bmod 4=0 \\ (RB_{start}+RB_{offset}(1))\bmod N_{BWP}^{size} & n_s^\mu \bmod 4=1 \\ (RB_{start}+RB_{offset}(2))\bmod N_{BWP}^{size} & n_s^\mu \bmod 4=2 \\ (RB_{start}+RB_{offset}(3))\bmod N_{BWP}^{size} & n_s^\mu \bmod 4=3 \end{cases}. \quad (10b)$$

In response to the repetition type being the second repetition type, the frequency hopping mode shown in FIG. 10 satisfies the following formula:

$$RB_{start}(i)=\begin{cases} RB_{start} & i \bmod 4=0 \\ (RB_{start}+RB_{offset}(k))\bmod N_{BWP}^{size} & i \bmod 4=1\ \text{or}\ 2\ \text{or}\ 3 \end{cases}. \quad (10c)$$

$RB_{offset}$ (k) represents a frequency domain offset of a $k^{th}$ repeated transmission, $$n_s^\mu$$

is a slot index, and $$k=n_s^\mu$$

mod 4. As described above, in response to the message 3 being repeatedly transmitted, which frequency hopping mode calls for selection is called to be indicated by the third information in the scheduling information. In some embodiments, the third information is alternatively carried in a system information block 1 (system information block 1, SIB1) or carried in other system information (other system information, OSI).

The third information includes at least one bit. In response to the third information including one bit, and a value of the bit is 0, the first frequency hopping mode is indicated; or in response to the value of the bit being 1, the second frequency hopping mode is indicated. Certainly, there alternatively is a converse case. In response to the value of the bit being 1, the first frequency hopping mode is indicated; or in response to the value of the bit being 0, the second frequency hopping mode is indicated. In response to the third information including another quantity of bits, refer to the foregoing descriptions. Details are not described herein again.

Further, in response to there being a plurality of (more than two) start positions of $RB_{start}$, the indication of $RB_{offset}$ is called to be newly set out. More frequency hopping positions help obtain more frequency domain diversity gains. For an indication of the frequency offset, refer to Table 3.

TABLE 3

| Quantity of PRBs included in the BWP | Value of $N_{UL,hop}$ | Frequency offset of a second hop |
|---|---|---|
| $N_{BWP}^{size}<50$ | 0 | $RB_{offset}$ set 1 |
| | 1 | $RB_{offset}$ set 2 |

TABLE 3-continued

| Quantity of PRBs included in the BWP | Value of $N_{UL,hop}$ | Frequency offset of a second hop |
|---|---|---|
| $N_{BWP}^{size} \geq 50$ | 00 | $RB_{offset}$ set 1 |
| | 01 | $RB_{offset}$ set 2 |
| | 10 | $RB_{offset}$ set 3 |
| | 11 | $RB_{offset}$ set 4 |

In Table 3, a value of one $N_{UL,hop}$ indicates a frequency domain offset set, that is, an $RB_{offset}$ set 1, an $RB_{offset}$ set 2, an $RB_{offset}$ set 3, and an $RB_{offset}$ set 4. Each set predetermines a different $RB_{offset}$. Using four times of repeated transmission as an example, frequency domain offset positions included in the $RB_{offset}$ set 1 is $$\{\lfloor N_{BWP}^{size}/2 \rfloor, \lfloor N_{BWP}^{size}/4 \rfloor, -\lfloor N_{BWP}^{size}/4 \rfloor\}.$$

$RB_{offset}$ (k) corresponds to a value of a $k^{th}$ element in the set. For example, $RB_{offset}$ (1) corresponds to the first element $$\lfloor N_{BWP}^{size}/2 \rfloor,$$

$RB_{offset}$ (2) corresponds to $$\lfloor N_{BWP}^{size}/4 \rfloor,$$

and $RB_{offset}$ (3) corresponds to $$-\lfloor N_{BWP}^{size}/4 \rfloor.$$

Because there is many possible values of $RB_{offset}$ in each set, the values are not listed one by one herein. In response to the quantity of times the message 3 is repeatedly transmitted being greater than 2, and a quantity of candidate frequency hopping positions selected during frequency hopping pattern selection is greater than 2, Table 3 is applied to indicate a value of $RB_{offset}$. In response to the quantity of candidate frequency hopping positions in the selected frequency hopping mode being less than or equal to 2, the table in the existing standard is usable.

In some embodiments, in response to the message 3 being retransmitted, the scheduling information of the message 3 is indicated by DCI. During retransmission, a new field is added to the DCI to indicate a frequency hopping mode. In response to a frequency hopping mode not being indicated, a frequency hopping mode the same as that for initial transmission is used by default.

In some embodiments, the fourth information is further used to indicate the quantity of times of repeated transmission of the message 3. In a first possible implementation, the fourth information directly indicates the quantity of times of repeated transmission. For example, the fourth information is the quantity of times of repeated transmission, or the fourth information is an index value of the quantity of times of repeated transmission, for example, as shown in Table 4.

TABLE 4

| Fourth information | Index value | Quantity of times of repeated transmission |
|---|---|---|
| 00 | 00 | 1 |
| 01 | 01 | 2 |
| 10 | 10 | 4 |
| 11 | 11 | 8 |

With reference to Table 4, in response to the fourth information being 01, the quantity of times of repeated transmission is 2. Other cases are not described again.

In a second possible implementation, the fourth information indirectly indicates the quantity of times of repeated transmission. For example, the fourth information indicates an index value of a relational expression used to determine the quantity of times of repeated transmission. Through this method, the quantity of times of repeated transmission is flexibly indicated, for example, as shown in Table 5.

TABLE 5

| Fourth information | Index value | Quantity of times of repeated transmission |
|---|---|---|
| 00 | 00 | Relational expression 1: Y/(8H) |
| 01 | 01 | Relational expression 2: Y/(4H) |
| 10 | 10 | Relational expression 3: Y/(2H) |
| 11 | 11 | Relational expression 4: Y/H |

With reference to Table 5, in response to the fourth information being 01, relational expression 2 is indicated. In response to values of Y and H being determined, the quantity of times of repeated transmission is also determined. Assuming that Y=16 and H=1, the quantities of times of repeated transmission in Table 5 are successively 16, 8, 4, and 2. Both Y and H is default values; or both Y and H are values configured by the network device, for example, configured through the SIB1; or one of Y and H is a default value, and the other is a value configured by the network device.

Optionally, the fourth information indirectly indicates the quantity of times of repeated transmission. Another implementation is shown in Table 6.

TABLE 6

| Fourth information | Index value | Quantity of times of repeated transmission |
|---|---|---|
| 00 | 00 | 1*Q |
| 01 | 01 | 2*Q |
| 10 | 10 | 4*Q |
| 11 | 11 | 8*Q |

With reference to Table 6, in response to the value of Q being determined, the quantity of times of repeated transmission is also determined. In response to Q not being configured by the network device, Q is set to 1 by default. In response to Q being configured by the network device, Q is configured through, for example, the SIB1 or another system message.

In some embodiments, to implement the functions in the foregoing embodiment, the network device and the terminal device include corresponding hardware structures and/or software modules for performing the functions. A person of ordinary skill in the art is able to be aware that, in combination with the units and the method steps of the examples described in the embodiments, the embodiments is implemented by hardware, software, or a combination of hardware and software. Whether a function is implemented by hardware, software, or hardware driven by computer software depends on a particular application scenario and a design constraint of the technical solutions.

Figure 11:
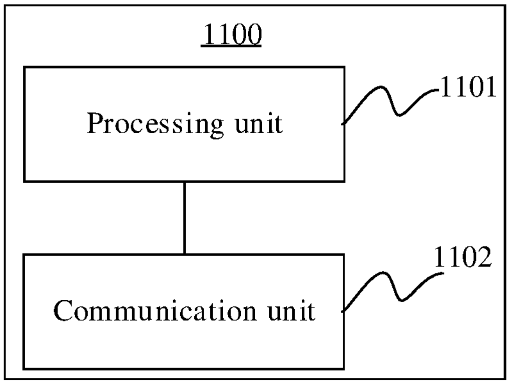
FIG. 11 is a schematic diagram of a structure of a communication apparatus according to some embodiments.
Figure 12:
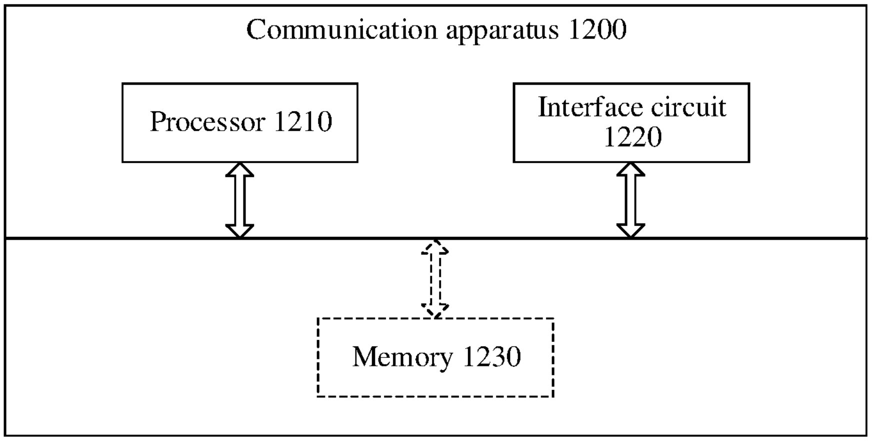
FIG. 12 is a schematic diagram of a structure of a communication apparatus according to some embodiments.

FIG. 11 and FIG. 12 are schematic diagrams of structures of possible communication apparatuses according to some embodiments. Such communication apparatuses are configured to implement the functions of the terminal device or the network device in the foregoing method embodiments, and therefore further implements the beneficial effects of the foregoing method embodiments. In some embodiments, the communication apparatus is a terminal device, or is a network device, or is a module (for example, a chip) applied to a terminal device or a network device.

As shown in FIG. 11, a communication apparatus 1100 includes a processing unit 1101 and a communication unit 1102. The communication apparatus 1100 is configured to implement the functions of the terminal device or the network device in the method embodiment shown in FIG. 3. Alternatively, the communication apparatus 1100 includes modules configured to implement any function or operation of the terminal device or the network device in the method embodiment shown in FIG. 3. All or some of the modules are implemented by software, hardware, firmware, or any combination thereof.

In response to the communication apparatus 1100 being configured to implement the functions of the network device in the method embodiment shown in FIG. 3, the processing unit is configured to receive a random access request from a terminal device through the communication unit; and the processing unit is configured to send a random access response to the terminal device through the communication unit, where the random access response includes scheduling information of a message 3, the scheduling information includes first information, and the first information indicates the terminal device to repeatedly transmit the message 3 by using same transmit power and a same precoding matrix.

In response to the communication apparatus 1100 being configured to implement the functions of the terminal device in the method embodiment shown in FIG. 3, the processing unit is configured to receive a random access response from a network device through a communication unit, where the random access response includes scheduling information of a message 3, the scheduling information includes first information, and the first information indicates the terminal device to repeatedly transmit the message 3 by using same transmit power and a same precoding matrix; and the processing unit is configured to repeatedly transmit the message 3 based on the first information by using the same transmit power and the same precoding matrix through the communication unit.

For more detailed descriptions of the processing unit 1101 and the communication unit 1102, directly refer to related descriptions in the method embodiment shown in FIG. 3. Details are not described herein again.

As shown in FIG. 12, a communication apparatus 1200 includes a processor 1210 and an interface circuit 1220. The processor 1210 and the interface circuit 1220 are coupled to each other. In some embodiments, the interface circuit 1220 is a transceiver or an input/output interface. Optionally, the communication apparatus 1200 further includes a memory 1230, configured to store instructions executed by the processor 1210, or store input data usable by the processor 1210 to run the instructions, or store data generated after the processor 1210 runs the instructions.

In response to the communication apparatus 1200 being configured to implement the method shown in FIG. 3, the processor 1210 is configured to implement the function of the processing unit 1101, and the interface circuit 1220 is configured to implement the function of the communication unit 1102.

In response to the communication apparatus being a chip applied to the terminal device, the terminal device chip implements the functions of the terminal device in the foregoing method embodiments. The terminal device chip receives information from another module (for example, a radio frequency module or an antenna) in the terminal device, where the information is sent by the network device to the terminal device; or the terminal device chip sends information to another module (for example, a radio frequency module or an antenna) in the terminal device, where the information is sent by the terminal device to the network device.

In response to the communication apparatus being a chip applied to the network device, the network device chip implements the functions of the network device in the foregoing method embodiments. The network device chip receives information from another module (for example, a radio frequency module or an antenna) in the network device, where the information is sent by the terminal device to the network device; or the network device chip sends information to another module (for example, a radio frequency module or an antenna) in the network device, where the information is sent by the network device to the terminal device.

In some embodiments, the processor in some embodiments are a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor is a microprocessor or any regular processor or the like.

The processor in some embodiments are a random access memory (Random Access Memory, RAM), a flash memory, a read-only memory (Read-Only Memory, ROM), a programmable ROM (Programmable ROM, PROM), an erasable PROM (Erasable PROM, EPROM), an electrically EPROM (Electrically EPROM, EEPROM), a register, a hard disk, a removable hard disk, a CD-ROM, or a storage medium of any other form well-known in the art. For example, a storage medium is coupled to a processor, so that the processor reads information from the storage medium and write information into the storage medium. Certainly, the storage medium is a component of the processor. The processor and the storage medium is disposed in an ASIC. In addition, the ASIC is located in a network device or a terminal device. Certainly, the processor and the storage medium exists in the network device or the terminal device as discrete components.

A person skilled in the art is able to understand that the embodiments are provided as a method, a system, or a computer program product. Therefore, the embodiments are configured to use a form of a hardware embodiment, a software embodiment, or an embodiment with a combination of software and hardware. Moreover, some embodiments are configured to use a form of a computer program product that is implemented on one or more computer-usable storage media (including but not limited to a disk memory, an optical memory, and the like) that include computer-usable program code. Some embodiments are described with reference to the flowcharts and/or block diagrams of the method, the device (system), and the computer program product according to some embodiments. In some embodiments, computer program instructions are used to implement each process and/or each block in the flowcharts and/or the block diagrams and a combination of a process and/or a block in the flowcharts and/or the block diagrams. The computer program instructions are provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more procedures in the flowcharts and/or in one or more blocks in the block diagrams.

The computer program instructions alternatively is stored in a computer-readable memory that indicates a computer or another programmable data processing device to work in a manner, so that the instructions stored in the computer-readable memory generate an artifact that includes an instruction apparatus. The instruction apparatus implements a function in one or more procedures in the flowcharts and/or in one or more blocks in the block diagrams.

A person skilled in the art is able to make various modifications and variations to the embodiments without departing from the scope of the embodiments. The embodiments are intended to cover these modifications and variations of the embodiments provided that the modifications and variations fall within the scope of protection set out by the following claims and equivalent technologies.

What is claimed is:

1. A communication method, comprising:

receiving, a random access request from a terminal device; and sending, a random access response to the terminal device, wherein:

the random access response includes scheduling information of a message 3; and the scheduling information includes first information that includes a request that the terminal device repeatedly transmit the message 3 with a similar transmit power and a similar precoding matrix for each transmission of the message 3; wherein:

the scheduling information further includes second information that includes a repetition type of the message 3 that is a first repetition type or a second repetition type;

in response to the message 3 being repeatedly transmitted by using the first repetition type, an index value of a start symbol for each time of repeated transmission of the message 3 is the same; and in response to the message 3 being repeatedly transmitted by using the second repetition type, the index value of the start symbol for each time of repeated transmission of the message 3 is different.

2. The method according to claim 1, further comprising:

sending, third information to the terminal device that includes a frequency hopping mode for repeatedly transmitting the message 3.

3. The method according to claim 2, wherein:

the frequency hopping mode includes one or more of the following:

a first frequency hopping mode, in which a first frequency domain position is usable for first N times of repeated transmission, and a second frequency domain position is usable for subsequent M times of repeated transmission, wherein:

N is an integer greater than 0;

M is an integer greater than 0; and

N+M is greater than 2; and a second frequency hopping mode, that includes X times of repeated transmission, wherein frequency domain positions for an $i^{th}$ time of repeated transmission and an $(i+L)^{th}$ time of repeated transmission are the same, and frequency domain positions for at least two times of repeated transmission from the $i^{th}$ time of repeated transmission to an $(i+L-1)^{th}$ time of repeated transmission are different, wherein:

X is an integer greater than 2;

i is 0, 1, . . . , or X−1; and

L is an integer less than X.

4. The method according to claim 2, wherein:

the third information is included in the scheduling information; or the third information is included in a system information block 1 (SIB1) or other system information.

5. The method according to claim 1, wherein the scheduling information further comprises fourth information, and the fourth information indicates a quantity of times of repeated transmission of the message 3.

6. A communication method, comprising:

receiving, a random access response from a network device that includes scheduling information of a message 3 that includes first information to request repeated transmission of the message 3 at a same transmit power and a same precoding matrix; and repeatedly transmitting, the message 3 based on the first information at the same transmit power and the same precoding matrix for each transmission of the message 3; wherein:

the scheduling information further includes second information that includes a repetition type of the message 3 that is a first repetition type or a second repetition type;

in response to the message 3 being repeatedly transmitted at the first repetition type, an index value of a start symbol for each time of repeated transmission of the message 3 is the same; and in response to the message 3 being repeatedly transmitted at the second repetition type, the index value of the start symbol for each time of repeated transmission of the message 3 is different.

7. The method according to claim 6, further comprising:

receiving, third information from the network device that includes a frequency hopping mode for repeatedly transmitting the message 3.

8. The method according to claim 7, wherein:

the frequency hopping mode includes one or more of the following:

a first frequency hopping mode, in which a first frequency domain position is usable for first N times of repeated transmission, and a second frequency domain position is usable for subsequent M times of repeated transmission, wherein:

N is an integer greater than 0;

M is an integer greater than 0 and

N+M is greater than 2; and a second frequency hopping mode, includes X times of repeated transmission, wherein:

frequency domain positions for an $i^{th}$ time of repeated transmission and an $(i+L)^{th}$ time of repeated transmission are the same; and frequency domain positions for at least two times of repeated transmission from the $i^{th}$ time of repeated transmission to an $(i+L-1)^{th}$ time of repeated transmission are different, wherein:

X is an integer greater than 2;

i is 0, 1, . . . , or X−1; and

L is an integer less than X.

9. The method according to claim 7, wherein:

the third information is included in the scheduling information; or the third information is included in a system information block 1 (SIB1) or other system information.

10. The method according to claim 6, wherein the scheduling information further comprises fourth information, and the fourth information indicates a quantity of times of repeated transmission of the message 3.

11. A communication apparatus, comprising:

a processing unit, configured to receive a random access request from a terminal device through a communication unit, wherein:

the processing unit is configured to send a random access response to the terminal device through the communication unit, wherein:

the random access response includes scheduling information of a message 3 that includes first information that requests the terminal device repeatedly transmit the message 3 at a same transmit power and a same precoding matrix for each transmission of the message 3; wherein:

the scheduling information further includes second information that includes a repetition type of the message 3 that is a first repetition type or a second repetition type;

in response to the message 3 being repeatedly transmitted with the first repetition type, an index value of a start symbol for each time of repeated transmission of the message 3 is the same; and the message 3 being repeatedly transmitted with the second repetition type, the index value of the start symbol for each time of repeated transmission of the message 3 is different.

12. The apparatus according to claim 11, wherein:

the communication unit is further configured to:

send third information to the terminal device that includes a frequency hopping mode for repeatedly transmitting the message 3.

13. The apparatus according to claim 12, wherein:

the frequency hopping mode includes one or more of the following:

a first frequency hopping mode, in which a first frequency domain position is usable for first N times of repeated transmission, and a second frequency domain position is usable for subsequent M times of repeated transmission, wherein:

N is an integer greater than 0;

M is an integer greater than 0; and

N+M is greater than 2; and a second frequency hopping mode, that includes X times of repeated transmission, wherein:

frequency domain positions for an $i^{th}$ time of repeated transmission and an $(i+L)^{th}$ time of repeated transmission are the same; and frequency domain positions for at least two times of repeated transmission from the $i^{th}$ time of repeated transmission to an $(i+L-1)^{th}$ time of repeated transmission are different, wherein:

X is an integer greater than 2;

i is 0, 1, . . . , or X−1; and

L is an integer less than X.

14. The apparatus according to claim 12, wherein:

the third information is included in the scheduling information; or the third information is included in a system information block 1 (SIB1) or other system information.

15. The apparatus according to claim 11, wherein the scheduling information further comprises fourth information, and the fourth information indicates a quantity of times of repeated transmission of the message 3.

16. A communication apparatus, comprising:

a communication unit; and a processing unit, configured to receive a random access response from a network device through the communication unit, wherein the random access response includes scheduling information of a message 3 that includes first information that requests repeated transmission of the message 3 at a same transmit power and a same precoding matrix for each transmission of the message 3, wherein:

the processing unit is configured to repeatedly transmit the message 3 based on the first information by using the same transmit power and the same precoding matrix through the communication unit; wherein:

the scheduling information further includes second information that includes a repetition type of the message 3 that is a first repetition type or a second repetition type;

in response to the message 3 being repeatedly transmitted with the first repetition type, an index value of a start symbol for each time of repeated transmission of the message 3 is the same; and in response to the message 3 being repeatedly transmitted with the second repetition type, the index value of the start symbol for each time of repeated transmission of the message 3 is different.

17. The apparatus according to claim 16, wherein:

the communication unit is further configured to:

receive third information from the network device that includes a frequency hopping mode for repeatedly transmitting the message 3.

18. The apparatus according to claim 17, wherein:

the frequency hopping mode includes one or more of the following:

a first frequency hopping mode, in which a first frequency domain position is usable for first N times of repeated transmission, and a second frequency domain position is usable for subsequent M times of repeated transmission, wherein:

N is an integer greater than 0;

M is an integer greater than 0; and

N+M is greater than 2; and a second frequency hopping mode, that includes X times of repeated transmission, wherein:

frequency domain positions for an $i^{th}$ time of repeated transmission and an $(i+L)^{th}$ time of repeated transmission are the same; and frequency domain positions for at least two times of repeated transmission from the $i^{th}$ time of repeated transmission to an $(i+L-1)^{th}$ time of repeated transmission are different, wherein:

X is an integer greater than 2;

i is 0, 1, . . . , or X−1; and

L is an integer less than X.

19. The apparatus according to claim 17, wherein:

the third information is included in the scheduling information; or the third information is included in a system information block 1 (SIB1) or other system information.

20. The apparatus according to claim 16, wherein the scheduling information further comprises fourth information, and the fourth information indicates a quantity of times of repeated transmission of the message 3.

* * * * *